(12) United States Patent
Kopchick et al.

(10) Patent No.: US 8,813,357 B2
(45) Date of Patent: *Aug. 26, 2014

(54) PISTON WITH BI-METALLIC DOME

(75) Inventors: Joseph C. Kopchick, Warren, MI (US); Mark A. Osborne, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/429,778

(22) Filed: Mar. 26, 2012

(65) Prior Publication Data

US 2012/0180749 A1    Jul. 19, 2012

Related U.S. Application Data

(63) Continuation-in-part of application No. 13/110,947, filed on May 19, 2011, now Pat. No. 8,763,247.

(60) Provisional application No. 61/390,373, filed on Oct. 6, 2010.

(51) Int. Cl.
    *B23P 11/00*     (2006.01)

(52) U.S. Cl.
    USPC ............... 29/888.044; 29/888.047; 123/193.6

(58) Field of Classification Search
    USPC ............ 29/888.047, 888.044; 123/193.6, 668
    IPC .................................. B22D 19/0027; F02F 3/14
    See application file for complete search history.

(56) References Cited

U.S. PATENT DOCUMENTS

| | | | | |
|---|---|---|---|---|
| 2,833,264 | A | * | 5/1958 | Dailey et al. .................. 123/668 |
| 4,098,514 | A | | 7/1978 | Guenther |
| 4,334,507 | A | * | 6/1982 | Kohnert et al. ............ 123/193.6 |
| 4,546,048 | A | | 10/1985 | Guenther |
| 4,754,798 | A | | 7/1988 | Chandley et al. |
| 4,838,149 | A | * | 6/1989 | Donnison et al. ................ 92/222 |
| 4,863,807 | A | * | 9/1989 | Krasicky, Jr. ................ 428/593 |
| 5,341,866 | A | * | 8/1994 | Munro ............................ 164/98 |
| 6,131,552 | A | | 10/2000 | Paielli et al. |
| 6,412,479 | B1 | | 7/2002 | Canfield et al. |
| 6,477,941 | B1 | | 11/2002 | Zhu et al. |

(Continued)

FOREIGN PATENT DOCUMENTS

| | | |
|---|---|---|
| CH | 379065 A | 6/1964 |
| CN | 1041299 A | 4/1990 |
| DE | 3831400 A1 | 3/1989 |
| DE | 29823552 U1 | 3/1998 |

(Continued)

*Primary Examiner* — M. McMahon
(74) *Attorney, Agent, or Firm* — Dinsmore & Shohl LLP

(57) ABSTRACT

A piston with a cast bi-metallic dome feature and a method of making the piston. In one form, the piston is for use in a diesel engine, while in another, the piston is for use in a gasoline engine. The dome feature may include a laminate of a relatively high-temperature material (such as stainless steel) and a relatively low temperature material (such as aluminum or aluminum alloys) such that the portion of the dome made from the relatively high-temperature material is directly exposed to combustion within a cylinder into which the piston is placed. In another form, an aluminum coated stainless steel layer is used to form the dome. In one form, an ablation casting process may be used to manufacture the dome.

10 Claims, 5 Drawing Sheets

(56) References Cited

U.S. PATENT DOCUMENTS

| | | |
|---|---|---|
| 6,513,477 B1 | 2/2003 | Gaiser et al. |
| 6,651,549 B2 | 11/2003 | Zhu et al. |
| 7,121,318 B2 | 10/2006 | Grassi et al. |
| 7,164,963 B2 | 1/2007 | Caulk |
| 2002/0189442 A1 | 12/2002 | Zhu et al. |
| 2005/0178521 A1* | 8/2005 | Grassi et al. .................. 164/34 |
| 2006/0086326 A1 | 4/2006 | Rasmussen |
| 2009/0025674 A1* | 1/2009 | Leitl ........................ 123/193.6 |
| 2012/0085228 A1* | 4/2012 | Kopchick et al. ............... 92/172 |

FOREIGN PATENT DOCUMENTS

| | | |
|---|---|---|
| DE | 102004033053 A1 | 1/2006 |
| DE | 102007029307 A1 | 12/2008 |
| DE | 102008004029 B3 | 9/2009 |
| GB | 1549220 | 7/1979 |
| JP | 62-240460 | 10/1987 |
| WO | 2009000420 A1 | 12/2008 |

\* cited by examiner

PISTON WITH BI-METALLIC DOME

CROSS-REFERENCE TO RELATED APPLICATION

This application is a continuation in part of co-pending application Ser. No. 13/110,947, filed May 19, 2011 that claims the benefit of Provisional Application Ser. No. 61/390,373, filed Oct. 6, 2010, entitled Diesel Piston With Bi-Metallic Dome, both of which are owned by the Assignee of the present invention and hereby incorporated by reference.

BACKGROUND OF THE INVENTION

The present invention relates generally to devices and methods for casting of engine components, and more particularly to an advanced bi-metallic piston and a way to manufacture the same.

The body of a piston used in internal combustion engines (ICEs) is typically made up of a cylindrical-shaped head (also called a dome), from which a downward-extending skirt will have one or more ring grooves formed in it, as well as lands between the grooves that are of the same radial outward dimension as the outward-facing surface of the remainder of the skirt. Such components are typically made from lightweight materials, and from relatively low-cost forming techniques; in a preferred form, pistons are made from a cast aluminum-based alloy. While they are subjected to high combustion temperatures and pressures during engine operation, increasingly stringent emissions and efficiency requirements dictate that pistons of the future will need to be designed to withstand even more demanding operating conditions. This in turn will necessitate the use of higher-temperature capable materials and damage-resistant designs. This is especially true for pistons used in diesel engines that, in addition to being the predominant engine form for larger, commercial vehicles, are increasingly being used to power passenger vehicles. Likewise, high-revving gasoline engines (such as four cylinder engines, especially those with turbochargers), in an attempt to simultaneously maximize power output and minimize fuel consumption, have an ever-increasing reliance upon hotter-burning environments and faster reciprocating components, both of which place additional burdens on engine component and material designs.

While all of the various piston components mentioned above are expected to be subjected to additional thermo-mechanical loads as more power is extracted from smaller structures, it is the dome which, by virtue of being directly exposed to the combustion process, can be expected to be particularly vulnerable to damage. Advancements in the understanding of combustion dynamics taking place in a chamber created by the piston and the cylinder has led to more complex-shaped piston dome designs, where alternating regions of valleys and risers result in an undulated dome surface. These improvements in combustion dynamics further hamper the use of lightweight alloys and their limited mechanical and temperature capability where aluminum alloys, which have conventionally been used for weight reduction in diesel engine pistons, have limited thermal and mechanical durability that makes them incompatible with the higher temperature requirements of a more complete (and therefore higher temperature) combustion process. Steel pistons have the capability to endure the extreme environment; however, they are heavier than aluminum pistons. This weight problem is exacerbated by the high rate of speed and acceleration associated with piston movement, meaning that ancillary structures may additionally have to be fortified, with an even more detrimental weight impact.

Attempts have been made to combine the heat resistance of high temperature-capable materials with the lower weight of aluminum-based materials in diesel pistons. However, although composite pistons may satisfy the above objectives, the difficulties associated with their manufacture have offset many of their benefits. This is especially so because pistons have long been made as cast parts with some post-casting machining or related modifications. As such, it has been difficult to combine the inherent low-cost approach of casting with the flexibility of tailored material placement in the piston.

As with the diesel pistons discussed above, the dome of a gasoline engine piston is also exposed to extreme temperatures and, depending on the dome design (e.g. relatively flat or highly featured) may be subject to the same type of cracking as a diesel piston with a combustion bowl or other surface irregularities. Additionally, gasoline engine piston domes are typically thinner than diesel piston domes, and therefore more likely to transfer heat to other regions of the piston—such as the top ring groove—very quickly. Such increased exposure would increase the need for additional measures in the ring groove, such as anodizing the ring groove or using a high-temperature metal insert to provide adequate strength. Cooling approaches may also be employed. Oil galleries may be used in both diesel and gasoline pistons (especially turbocharged versions of the latter) to cool ring grooves and other portions of the piston that are exposed to high heat loads. While features such as ring groove inserts and oil galleries provide valuable cooling functions, their inclusion exacerbates the cost and complexity of such high-work pistons.

SUMMARY OF THE INVENTION

One aspect of the invention is a method of making a diesel piston. In one embodiment, the method includes providing a pattern for the piston including a dome; forming a piston mold around the pattern, the mold comprising an aggregate material and a binder; removing the pattern from the piston mold; placing a bi-metallic ring in the piston mold at an upper surface of the dome; introducing molten metal into the piston mold with the bi-metallic ring; contacting the piston mold with a solvent for the binder and removing the binder and the aggregate; cooling the molten metal; and solidifying the molten metal to form the piston, the bi-metallic ring forming at least a portion of the upper surface of the dome. In the present context, the bi-metallic ring may be formed as a laminate of two or more metallic materials, such as a stainless steel overlayer and an aluminum-based underlayer.

Another aspect of the invention is a diesel piston. In one embodiment, the diesel piston includes a body and a dome, at least a portion of an upper surface of the dome comprising a bi-metallic ring, the bi-metallic ring comprising a first layer of aluminum or aluminum alloy and a second layer of stainless steel, and wherein the second layer forms at least the portion of the upper surface of the dome, the first layer being bonded with the body, the body comprising aluminum or aluminum alloy.

According to another aspect of the present invention, a piston for an internal combustion engine is disclosed. The domed surface of the piston is covered with a laminate material. Such a piston which (as with the diesel piston) is preferably formed by casting. The laminate is made of two (or more) layers of metal to form a bi-metallic layer, covering or related structure. The bi-metallic features of the laminate, when coupled to the head of the piston, would be beneficial as they would insulate the lower regions of the piston from excessive heat and would provide stiffness and strength to the dome. With the addition of the laminated piston covering of the present invention, it is possible that such further cooling or related measures associated with the high-work diesel and gasoline pistons mentioned herein may be simplified, if not outright eliminated.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

An ablation casting approach can be used to produce a piston with an as-cast dome incorporating a laminated material. The use of ablation casting offers the possibility of casting the piston with a near-net-shape dome without the significant machining required of other casting processes. In this way, a bi-metallic as-cast surface may be placed across at least portions of the piston dome. In one form, the portion may include the flat region from the piston outside circumference to the bowl rim. This could be beneficial in that by limiting application of the laminate to only flat shelf of the dome, it reinforces regions that are prone to high thermal stresses and offers some insulation benefits, while keeping weight increases to a minimum.

In one form, a more refractory layer may be used as one of the laminate layers, while an aluminum-based material may serve as another. In such construction, the lower-temperature aluminum-based layer would be disposed against the dome surface, while the more heat-tolerant layer (such as the aforementioned stainless steel) would be disposed on top of the first (lower temperature layer. In addition to enhanced resistance to thermal load relative to the aluminum, the stainless steel will provide a measure of stiffness to the dome, and due to its lower thermal conductivity relative to the underlying aluminum, it will act as a thermal barrier to prevent thermal fatigue cracks from forming at the bowl rim. The stainless steel material may also provide some measure of insulation of the ring grooves from combustion heat.

In a particular form, the laminate is configured as a dome insert. Using a cast-in insert eliminates the need for laser or tungsten inert gas (TIG) remelting that is typically employed to achieve very localized refinement.

In another form, a casting method can be used to create the bowl itself. In one form, the mold can be made from sand that is capable of ablation casting such that complex dome shapes, including those with reentrant features, may be easily and inexpensively manufactured.

Figure 1:
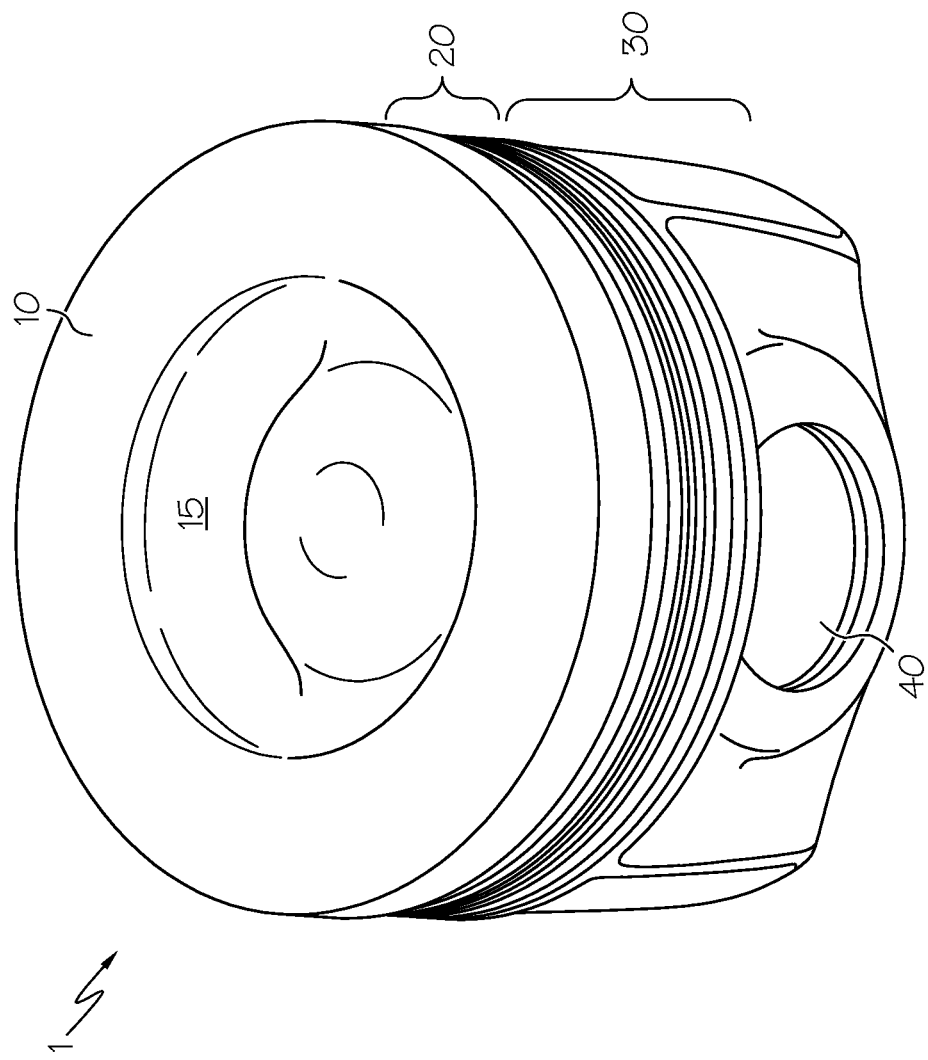
FIG. 1 is top perspective view of a diesel piston with a conventional metallic dome according to the prior art.
Figure 2:
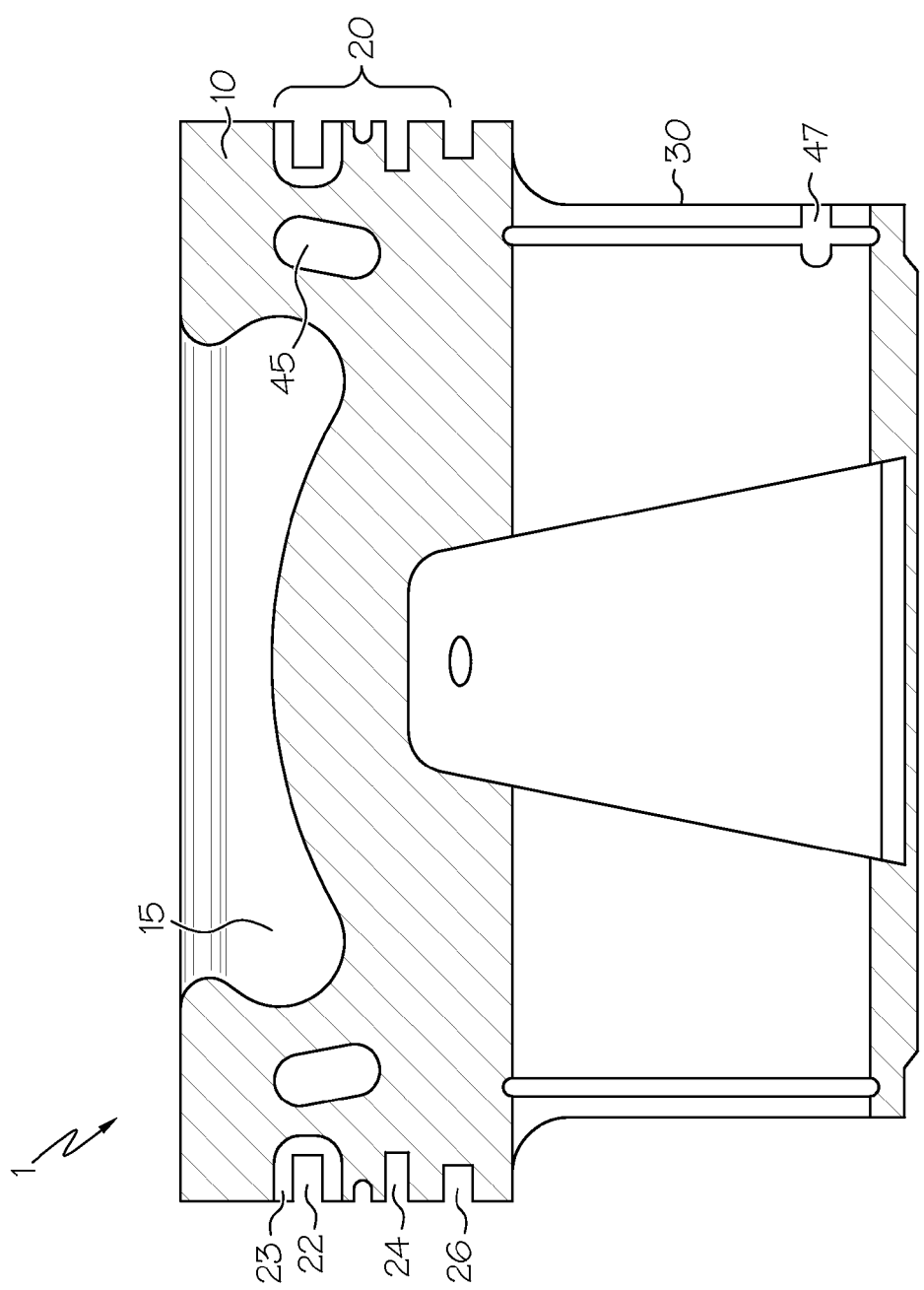
FIG. 2 is a cutaway view of the diesel piston of FIG. 1.

Referring first to FIGS. 1 and 2, a conventional diesel piston 1 is shown, where the top of the piston 1 terminates in a head (or dome) 10 that includes a generally flat outer peripheral portion and a recessed central portion 15. The downwardly-extending sidewall includes numerous grooves 20 formed therein, beneath which a skirt 30 extends toward the bottom of piston 1 where a piston pin hole 40 may be formed in piston 1 to accept a piston pin (not shown). The alloys used for the dome 10 of diesel piston 1 may be prone to early failure, especially in the upper locations along the generally planar upper portion, as well as the recessed central portion 15. Cracking is especially prevalent at locations such as these, where temperature regimes and manufacturing limitations may not be sufficient. Features used to increase coolant flow through piston 1 may include oil galleries 45 being fed through lubricant channels 47, such as depicted with particularity in FIG. 2. Likewise, features used to increase strength may include inserts (such as top ring groove insert 23) that is placed in one or more of the oil ring grooves 20.

Figure 3:
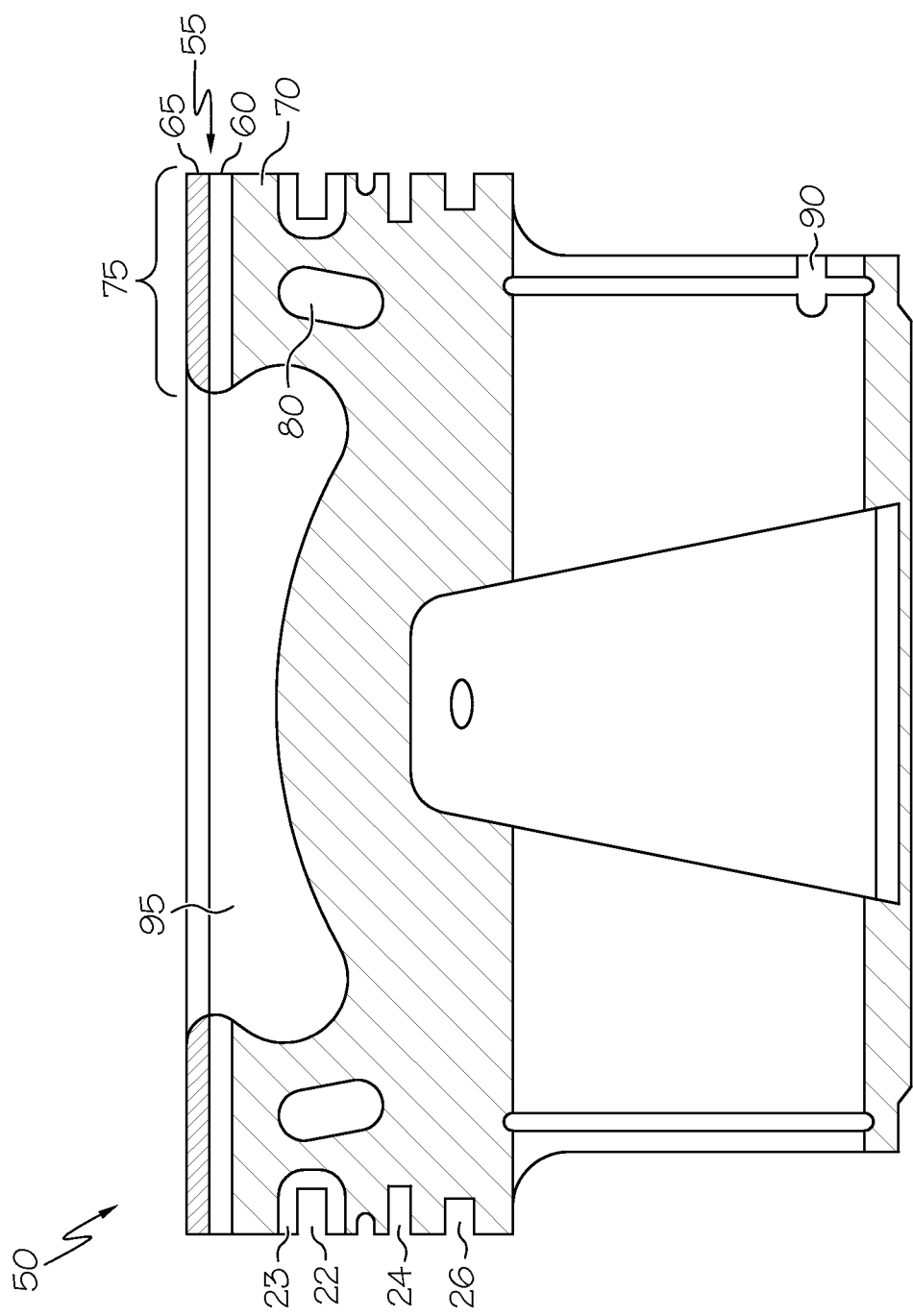
FIG. 3 shows a cutaway view of a piston according to an aspect of the present invention with at least a flat part of the dome being made of a bi-metallic material.

Referring next to FIG. 3, a diesel piston 50 according to one aspect of the present invention is shown. A combustion bowl 95 forms a depression or central recessed portion in the upper surface of dome 70. In this design, the upper surface of the dome 70 in general, and the generally planar outer periphery 75 in particular, may include a bi-metallic ring-shaped laminate 55. In one embodiment, the bi-metallic ring 55 is a laminate including a lower layer 60 of aluminum or aluminum alloy, and an upper layer 65 of a more heat-resistant material, such as a stainless steel. In one preferred form, the total thickness of the bi-metallic laminate would be about 4 to about 6 mm, with the aluminum portion being about 10-20% of the total thickness, although other thicknesses and aluminum percentages may also be employed. In one form, the laminate ring 55 could be made by stamping. In another embodiment, the laminate ring 55 may be formed from a stainless steel ring (about 4 to about 6 mm thick) that could be coated with a thin layer of aluminum (e.g., less than about 100 microns, or more particularly between about 25 and about 50 microns). The laminate ring 55 will be understood to cover a substantial entirety of the upper surface of dome 70 in configurations (not shown) where the undulations in the upper surface are either minimal, gradual or (in the case of a substantially planar upper surface) nonexistent.

In one preferred manufacturing approach, the laminate 55 may be cast with the remainder of the piston 50 by placing the laminate 55 in the mold (such as a sand mold) as an insert, where lower layer 60 of the laminate insert 55 will be the low melting point aluminum alloy which will metallurgically bond to the alloy being used in the mold to make dome 70. The laminate 55 thickness will be sufficient to ensure that the stainless steel material 65 encompasses the rim around the combustion bowl 95. Optionally, some minor edge machining may take place to provide a more rounded edge for stress concentration reduction. The stainless steel layer 65 will not only provide a thermal benefit as discussed above, its smooth surface finish additionally minimizes the presence of stress concentrators.

Using an ablation casting process should result in a much finer microstructure throughout, with resulting enhanced properties in piston 50. For example, the faster cooling associated with ablation casting leads to finer microstructures and better mechanical properties (as evidenced by smaller secondary dendrite arm spacing (SDAS)).

As shown with particularity in FIG. 3, an ablation casting approach can be used to produce piston 50 with a dome 70 incorporating the undercut combustion bowl 95 in an as-cast form. An optional internal cooling passage 80 (which may be generally similar to oil gallery 45, and include an oil feed channels generally similar to channel 47, both as shown in FIG. 2) may also be integrally formed, depending on the cooling requirements. Ablation uses inorganic (i.e., water soluble) cores, and water is sprayed on the mold which slowly washes away (hence the term "ablation"), rapidly cooling the casting. The rapid cooling results in improved material properties and, as discussed above, ablation casting allows complex parts to be produced with fine solidification microstructure. The application of water allows component solidification and cooling to be controlled separately from one another (e.g., by applying water to specific areas of the casting before others or by applying different amounts of water to different areas). By providing the high solidification rates and refined microstructure that are often needed to achieve the through-section higher mechanical properties (such as tensile and fatigue properties at room temperature and elevated temperatures), ablation casting allows complex parts to be formed, such as those combining both thin and thick sections, as well as those with complex internal cores. The through-section properties are superior compared to those made using bowl rim re-melting, which only provides the desirable fine microstructure to a depth only slightly below the surface (e.g., a few mm).

The ablation casting process is described generally in U.S. Pat. No. 7,121,318, which is incorporated by reference herein. A pattern is formed from a material, and a mold is formed around at least a portion of the pattern. The mold is made of aggregate material and a binder. The pattern is removed from the mold, and molten metal is then introduced into the mold. The mold is contacted with a solvent, and the molten metal is cooled so that it at least partially solidifies to form a casting. The cooling step includes contacting a shell of solidified metal around the molten metal with the solvent.

Other forms of casting are known. See, for example, U.S. Pat. Nos. 7,164,963, 7,618,823, and 7,225,049, each of which describe analysis methods for lost foam casting (a type of ablation casting) and are herein incorporated by reference. Nevertheless, the present inventors are unaware of any use of these or any other form of ablation casting to form diesel pistons in general, and more particularly diesel pistons with undercut combustion bowl. The use of ablation casting as discussed herein offers the possibility of casting the piston with a near-net-shape dome without the significant machining required by other processes. This in turn allows the dome 70 and combustion bowl 95 to be cast simultaneously. In a particular form, the undercut bowl 95 and internal passages (such as cooling passage 80) would be produced by means of an aggregate disposable mold that could be produced by conventional core technology with retractable tooling in the molding die. In the present context, the aggregate form of the molding media includes, but is not limited to, silica sand, zircon sand, chromite sand, ceramic micro spheres, or the like.

Among the benefits associated with the present invention are reduced machining costs, refined as-cast microstructure for improved mechanical properties, taking advantage of a sand (or related) molding process to tailor an undercut region (such as that shown in FIG. 3 in conjunction with the combustion dome 95), reducing casting weight, and eliminating the need for an internal salt core. The traditional salt core could be replaced with an aggregate core of the same material as the piston mold.

Improved material yield can be realized by eliminating the large risers that are often used as part of a permanent mold casting operation. In particular, by using an ablation casting approach, the inherently high cooling rate can allow the piston 50 being formed to have a homogeneous microstructure and related structural properties.

In addition to the finer microstructure and enhanced piston properties, use of the ablation process permits much finer details to be cast into the part, including intricate cooling channels, such as oil gallery (cooling passage) 80. The process reduces or eliminates the need for post-cast machining in the area around the dome 70, particularly as it relates to the undercut region of bowl 95. Because the ablation casting is production-ready, scaling up to manufacture large quantities of pistons or related components is comparatively simple. An aggregate disposable mold could be employed to allow the combustion bowl of the piston dome and a lubricating and cooling oil gallery to be formed as part of the casting.

Employing ablation casting for diesel piston 50 helps to achieve a significant microstructural refinement by reducing or eliminating the need for expensive secondary processing such as machining or remelting. In situations where a refined microstructure is desired, such as the bowl 95 edge or other complex 3D regions of the piston 50, tungsten inert gas (TIG) or laser remelting can be done locally (in the dome undercut region). Subsequent machining, such as to yield proper shape of the bowl edge, may be similarly reduced or eliminated.

In one form, this invention takes advantage of the ablation casting process to eliminate the need for large risers at the piston dome. The ability to cool the dome more quickly and uniformly should enhance mechanical properties. In particular, the disposable aggregate mold should allow the combustion bowl 95 to be formed as-cast. Furthermore, the aggregate mold material may also be used to form the oil gallery 80 behind the top ring groove, eliminating the need for a salt core. This additionally allows for rapid prototyping of piston 50, which can improve general development testing.

Figure 4:
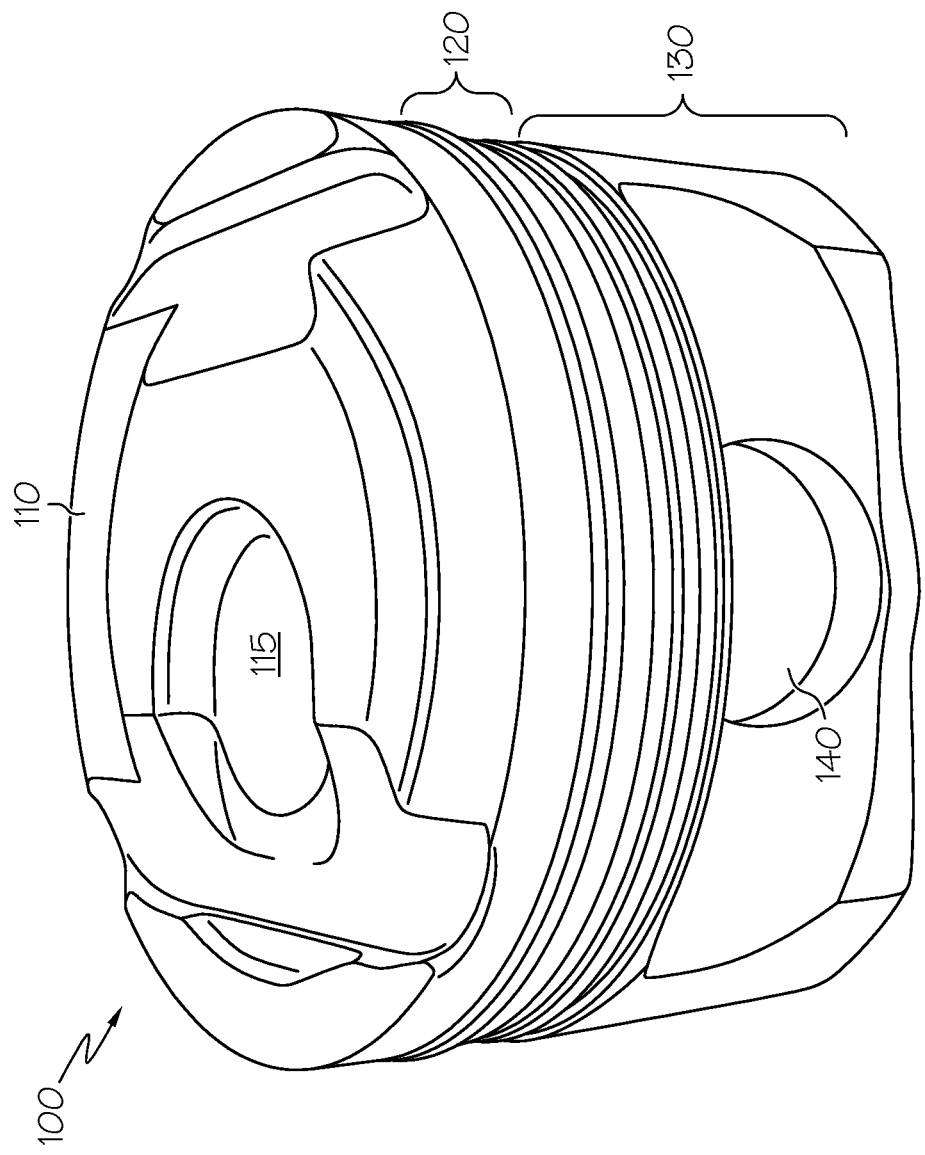
FIG. 4 shows an gasoline-engine version of a piston according to the present invention.
Figure 5:
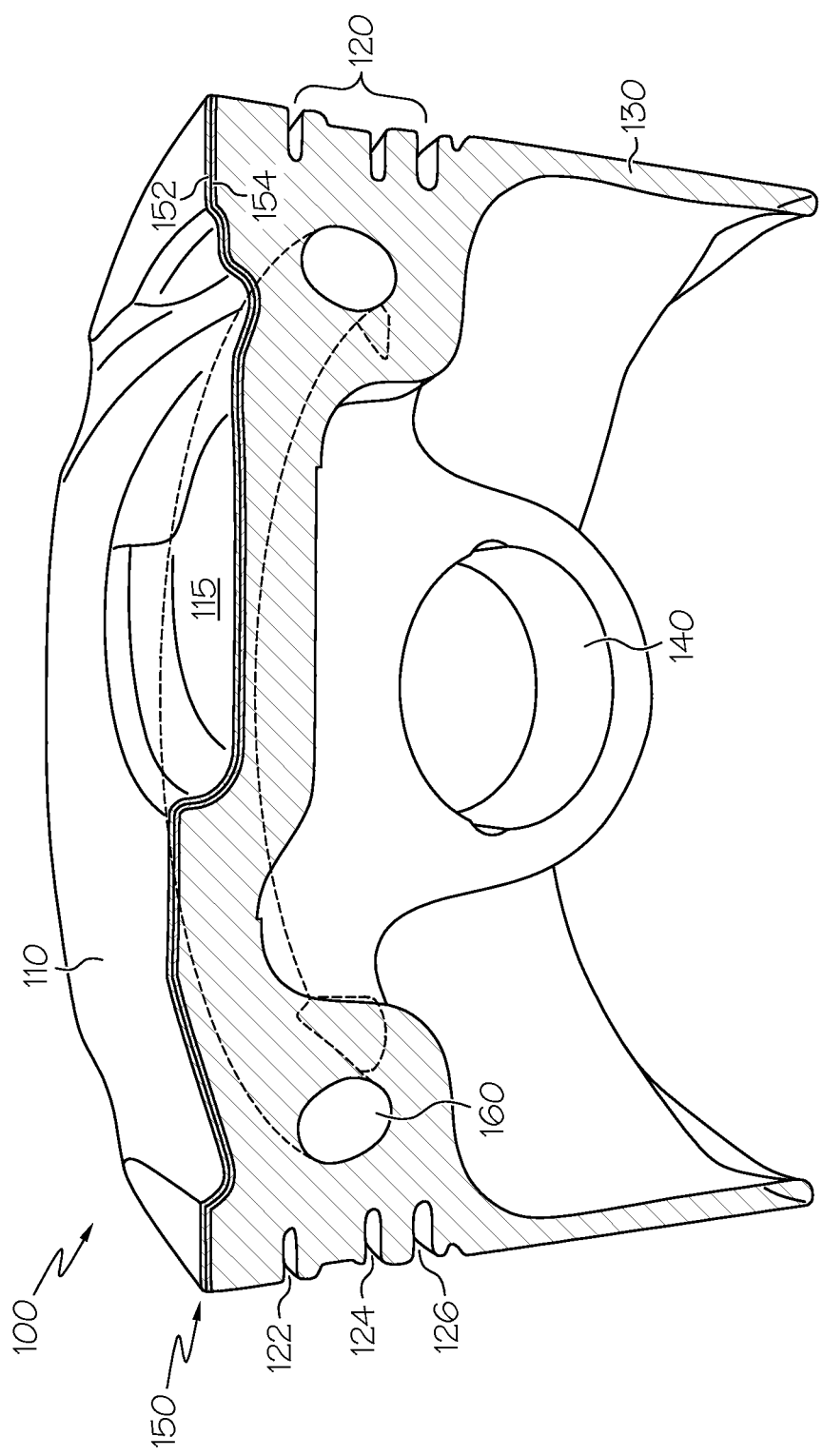
FIG. 5 shows a partial cutaway of FIG. 4 such that internal features, as well as the placement of the bi-metallic laminate, are exposed.

Referring next to FIGS. 4 and 5, a gasoline version of the piston 100 according to another aspect of the present invention is shown. The gasoline piston 100 includes a dome or head 110 with a notched area 115 that is generally analogous to bowl 95 of the diesel piston 50 shown in FIG. 3, as well as other highly-featured contours, surfaces or related shapes formed in the upper surface thereof. Although the upper surface of dome 110 shown is highly-featured, it will be appreciated by those skilled in the art that the present invention is equally applicable to pistons with a simpler (i.e., flat) dome surface. The dome 110 also includes numerous centrifugal grooves 120 formed downwardly along the generally cylindrical profile of piston 100; these grooves (shown individually as ring grooves 122, 124 and 126) are used for compression rings and oil rings. As with the diesel piston 50 of FIGS. 1 through 3, the uppermost ring groove 122 is exposed to the highest thermal loads, and as such, may also include a ring groove insert (not shown, but generally similar to ring groove insert 23 shown in the diesel piston 50 of FIG. 2) for use in situations where piston load-bearing needs are particularly stringent. Additional features, such as oil squirters (not shown) to cool the piston 100, may also be used.

In this design, the upper surface of the dome 110 is covered with a bi-metallic ring 150 made as a laminate of aluminum or aluminum alloy 154 underneath a stainless steel (for example, 300-series stainless steel) or related heat-resistant alloy 152. As shown with particularity in FIG. 5, oil gallery 160 may be used a way to accommodate higher combustion temperatures and higher stresses on the piston 100, where such galleries may be cast-in. The inclusion of the bi-metallic laminate 150 helps to simplify piston 100 by preferably reducing the size or complexity of such galleries, ring inserts or squirters, or more preferably eliminating, such galleries, ring inserts or squirters in their entirety.

As discussed above, the highly-featured or contoured nature of the head 110 stems from ways that shaping can optimize the combustion process, where the notched area 115 may form a combustion bowl that coincides with the most active portion of the combustion profile. Although both the diesel piston 50 and the gasoline piston 100 are shown notionally with three rings 20, 120 formed in the respective heads, it will be appreciated that there may be fewer or greater numbers of such rings, especially for the diesel piston 50, where up to five rings may be employed. Skirt 130 extends downwardly from the head 110, and includes a piston pin hole 140 to accept a piston pin (not shown) that is coupled to a connecting rod and crankshaft (neither of which are shown).

In one form, the bi-metallic laminate 150 would be stamped into either a flat disc and subsequently machined to final dome shape after casting, or cast directly into the dome shape with machining limited to removal of aluminum casting flash to expose the laminate.

The relatively poor thermal conductivity of the stainless steel layer 152 will insulate the top ring groove 122 and other critical regions, potentially eliminating the need for inserts, galleries (such as oil gallery 160) and squirters. Piston design (mass) may be optimized even with the addition of the stainless steel layer 152.

Piston 100 cast with bi-metallic laminate 150 in dome surfaces may be produced by any of several casting processes including the aforementioned ablation process, as well as by permanent mold and semi-permanent mold casting. Permanent mold or semi-permanent mold casting processes—which are more typical for high volume piston production—can also be used when incorporating the laminated (i.e., bi-metallic) material on the dome 110 of piston 100. The laminate material 150 will be fixtured in the casting die prior to metal injection, and the final shape of dome 110 will be achieved by machining to expose the surface of laminate material 150. As such, properties and microstructures would be typical of current production pistons. Important issues to consider include (a) positioning of the bi-metallic laminate material 150 in the mold such that the shape will be oriented correctly, and the stainless steel layer 152 will be on the exposed surface of dome 110; (b) using a thick enough section of bi-metallic material 150 to allow machining (clean-up) of the dome 110 surface to remove excess cast aluminum and expose the stainless steel with the correct final shape details; and (c) employing a non-destructive inspection method to evaluate the degree of bonding between the aluminum side of the bi-metallic material and the surface of the cast aluminum alloy.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. For the purposes of describing and defining the present invention it is noted that the term "device" is utilized herein to represent a combination of components and individual components, regardless of whether the components are combined with other components. Likewise, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

While certain representative embodiments and details have been shown for purposes of illustrating the invention, it will be apparent to those skilled in the art that various changes may be made without departing from the scope of the invention, which is defined in the appended claims.

What is claimed is:

1. A method of making a piston for an internal combustion engine, the method comprising:
   providing a pattern for the piston including a dome;
   forming a piston mold around the pattern, the mold comprising an aggregate material and a binder;
   removing the pattern from the piston mold;
   placing a multilayer metal laminate in the piston mold at a location that defines an upper surface of the dome of the piston to be formed;
   introducing molten metal into the piston mold;
   contacting the piston mold with a solvent for the binder and removing the binder and the aggregate;
   cooling the molten metal such that the laminate forms at least a portion of the upper surface of the dome.

2. The method of claim 1, wherein the piston is configured as a gasoline engine piston.

3. The method of claim 1, wherein said laminate comprises a bi-metallic layer comprising a first layer of aluminum-based material and a second layer of stainless steel-based material such that upon formation of said piston, said second layer forms an uppermost surface of said dome.

4. The method of claim 3, wherein said bi-metallic layer is made by stamping.

5. The method of claim 1, wherein said binder is water soluble, said solvent is water and said aggregate material is silica sand, zircon sand, chromite sand, ceramic micro spheres, or combinations thereof.

6. The method of claim 1, wherein contacting said piston mold with a solvent for said binder comprises spraying said piston mold with said solvent.

7. A method of making a piston for an internal combustion engine, said method comprising:
   placing a multilayer metal laminate into a piston-shaped mold;
   introducing molten metal into piston-shaped mold such that said molten metal contacts said laminate;
   ablation casting said molten metal;
   cooling said molten metal such that upon solidification of said molten metal, said piston is formed and defines a substantially one-piece structure with said laminate forming at least a portion of an upper surface of a dome that defines an upper portion of said piston.

8. The method of claim 7, wherein said piston is a gasoline engine piston.

9. The method of claim 7, wherein said dome defines an undulated surface.

10. The method of claim 7, wherein said laminate covers only a portion of said undulated surface.

* * * * *